United States Patent
Seo et al.

(10) Patent No.: US 8,497,604 B2
(45) Date of Patent: Jul. 30, 2013

(54) APPARATUS AND SYSTEM FOR CONTROLLING POWER SAVING IN BIDET

(76) Inventors: In Seok Seo, Seoul (KR); Ki Chul Kim, Seoul (KR); Joung Ho Son, Seoul (KR); Ju Hyun Baek, Seoul (KR)

(*) Notice: Subject to any disclaimer, the term of this patent is extended or adjusted under 35 U.S.C. 154(b) by 344 days.

(21) Appl. No.: 12/895,262

(22) Filed: Sep. 30, 2010

(65) Prior Publication Data
US 2011/0257807 A1    Oct. 20, 2011

(30) Foreign Application Priority Data
Apr. 15, 2010    (KR) .................. 10-2010-0034895

(51) Int. Cl.
*H01H 35/00*    (2006.01)
(52) U.S. Cl.
USPC ........................................... 307/116
(58) Field of Classification Search
USPC ........................................... 307/116
See application file for complete search history.

(56) References Cited

U.S. PATENT DOCUMENTS

| | | | |
|---|---|---|---|
| 5,936,620 A | 8/1999 | Komine et al. | |
| 6,052,837 A * | 4/2000 | Norton et al. | 4/217 |
| 2004/0193980 A1* | 9/2004 | Avery et al. | 714/724 |
| 2008/0040842 A1* | 2/2008 | Sanabria | 4/213 |

FOREIGN PATENT DOCUMENTS

| | | |
|---|---|---|
| CN | 101060246 A | 10/2007 |
| JP | 49-032695 | 9/1974 |
| JP | 58-030299 | 4/1979 |
| JP | 63-061481 | 4/1988 |
| JP | 04-026326 | 1/1992 |

* cited by examiner

*Primary Examiner* — Daniel Cavallari
(74) *Attorney, Agent, or Firm* — Dority & Manning, P.A.

(57) ABSTRACT

Disclosed is an apparatus and system for controlling power saving. The system for controlling power saving includes: a battery supplying power; a power saving controlling apparatus including a sensing unit detecting a user's contact and generating an activation signal when a user's contact is acknowledged, a latch unit maintaining the activation signal which has been received from the sensing unit, and a switch unit disposed on a current path that delivers power, and connecting the current path according to the activation signal from the latch unit; and a microcomputer controlling an operation of the system connected upon receiving power from the power saving controlling apparatus.

9 Claims, 4 Drawing Sheets

APPARATUS AND SYSTEM FOR CONTROLLING POWER SAVING IN BIDET

CROSS-REFERENCE TO RELATED APPLICATIONS

This application claims the priority of Korean Patent Application No. 10-2010-0034895 filed on Apr. 15, 2010, in the Korean Intellectual Property Office, the disclosure of which is incorporated herein by reference.

BACKGROUND OF THE INVENTION

1. Field of the Invention

The present invention relates to an apparatus and system for controlling power saving and, more particularly, to an apparatus and system for controlling power supply to save power in a bidet or an electronic product.

2. Description of the Related Art

A conventional bidet receives power through an external power source (AC100~240V) to operate a heater, or the like, and converts the power into DC 5~24V to use it as a power source for internal electronic components and a panel board assembly (PBA). In this case, however, some houses do not have a power supply facility in a location in which a bidet is to be installed or some people in a particular region are reluctant to use electricity in rest rooms, so they do not choose to use the bidet.

To solve the problem, a bidet having a self-generation function has been proposed. The bidet having a self-generation function can overcome restrictions in locations where power supply is not smooth and stimulate those who are reluctant to use electricity in rest rooms to use the bidet.

However, the bidet having the self-generation function is expected to be continuously used on the presumption that a generation capacity of the bidet is greater than a power usage amount of the bidet. However, the generation capacity of the self-generative bidet is too small, so there is a need to minimize the power usage amount of the bidet.

A general bidet usage pattern shows that the bidet is practically used for about forty minutes in 24 hours of a day, meaning that the bidet is left in standby for approximately 96 percent of the time. Thus, a design for minimizing the use of power for 23 hours, tantamount to 96 percent of the time in a day, is requisite for the bidet having the self-generation function.

SUMMARY OF THE INVENTION

An aspect of the present invention provides an apparatus and system for controlling power saving capable of activating an electricity system of a bidet or a home appliance by detecting a contact for using the bidet or the home appliance and deactivating the electricity system of a bidet or a home appliance by detecting the end of the use of the bidet or the home appliance.

According to an aspect of the present invention, there is provided an apparatus for controlling power saving, including: a sensing unit detecting a user's contact and generating an activation signal when a user's contact is acknowledged; a latch unit maintaining the activation signal which has been received from the sensing unit; and a switch unit disposed on a current path that delivers power, and connecting the current path according to the activation signal from the latch unit.

According to another aspect of the present invention, there is provided a system for controlling power saving, including: a battery supplying power; a power saving controlling apparatus including a sensing unit detecting a user's contact and generating an activation signal when a user's contact is acknowledged, a latch unit maintaining the activation signal which has been received from the sensing unit, and a switch unit disposed on a current path that delivers power, and connecting the current path according to the activation signal from the latch unit; and a microcomputer controlling an operation of the system connected upon receiving power from the power saving controlling apparatus.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
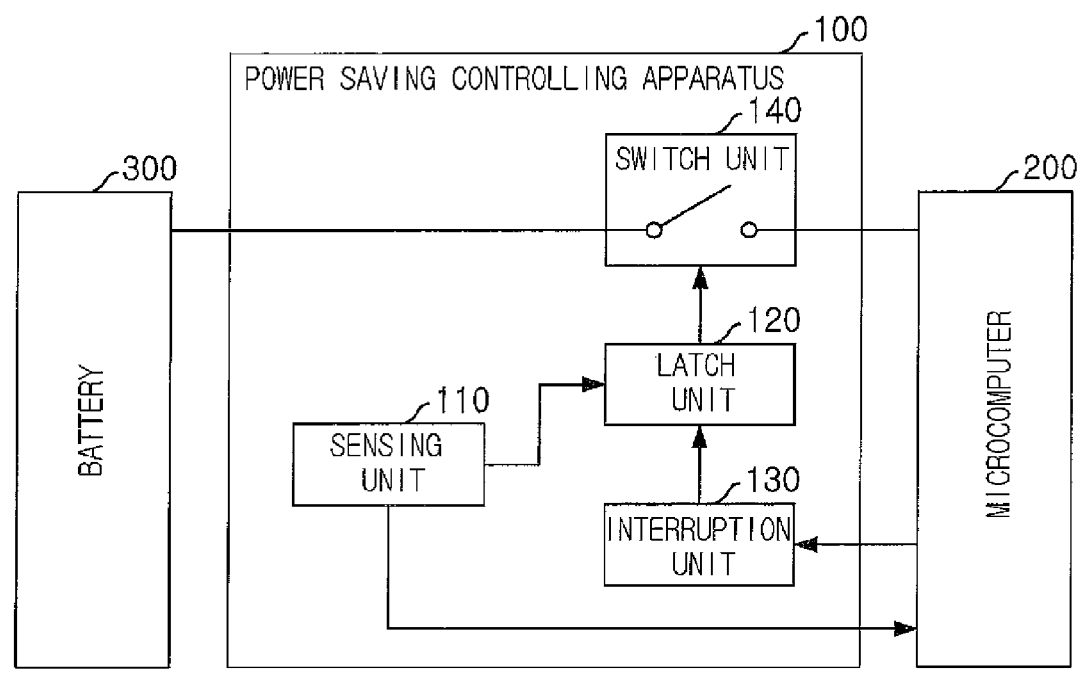
FIG. 1 is a schematic block diagram of a system for controlling power saving according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In describing the present invention, if a detailed explanation for a related known function or construction is considered to unnecessarily divert from the gist of the present invention, such explanation will be omitted but would be understood by those skilled in the art.

In the drawings, the shapes and dimensions may be exaggerated for clarity, and the same reference numerals will be used throughout to designate the same or like components.

Unless explicitly described to the contrary, the word "comprise" and variations such as "comprises" or "comprising," will be understood to imply the inclusion of stated elements but not the exclusion of any other elements.

FIG. 1 is a schematic block diagram of a system for controlling power saving according to an exemplary embodiment of the present invention.

With reference to FIG. 1, a system for controlling power saving according to an exemplary embodiment of the present invention may include a power saving controlling apparatus 100, a microcomputer 200, and a battery 300.

The microcomputer 200 serves to control an electric circuit to which the system for controlling power saving according to an exemplary embodiment of the present invention is applied. In general, the microcomputer 200 may be implemented as a small microprocessor or an operational chip for an embedded system.

The microcomputer 200 receives information indicating that there has been no user contact from a sensing unit of the power saving controlling apparatus 100, and determines whether or not the user has terminated the use of an electric circuit, or the like. When the microcomputer 200 determines that the user has terminated the use of an electric circuit, it generates an interruption signal and transmits it to the power saving controlling apparatus 100. When power interruption is required, the microcomputer 200 may generate an interruption signal and transmit it to the power saving controlling apparatus regardless of whether or not there has been a user contact.

Preferably, the microcomputer 200 performs an operation for terminating the operation before generating the interruption signal, and then generates the interruption signal and transmits it to the power saving controlling apparatus 100.

The battery 300 stores electrical energy and supplies power to the microcomputer 200 or an electrical circuit through the power saving controlling apparatus 100.

The power saving controlling apparatus 100 supplies power to the microcomputer 200 and the electrical circuit only when the electrical circuit uses the power saving controlling system. Also, when it is determined that the electrical circuit is not in use, the power saving controlling apparatus 100 may cut off power supply. Preferably, when the microcomputer 200 determines that the electrical circuit is not in use, the power saving controlling apparatus 100 may receive the corresponding determination information from the microcomputer 200 and cut off power.

With reference to FIG. 1, the power saving controlling apparatus 100 may include a sensing unit 110 and a latch unit 120, and may further include an interruption unit 130 or a switch unit 140.

The sensing unit 110 detects whether or not the user comes into contact. When the sensing unit determines a user's contact, it generates an activation signal. The activation signal is to activate the latch unit 120 to deliver power from the battery 300 to the microcomputer 200 and the electrical circuit through the power saving controlling apparatus 100.

Even when power is not supplied to the electrical circuit or the microcomputer 200, the sensing unit 110 may detect whether or not the user comes into contact with the power saving controlling system or a home appliance including the power saving controlling system to use it.

Preferably, the activation signal generated by the sensing unit 110 has a high signal value. This is to allow for the use of power only when the sensing unit 110 generates the activation signal. In addition, the sensing unit 110 may hand over only the user contact information with low power consumption and change to a non-operational state while merely performing a contact sensing function.

When the sensing unit 110 checks a non-contact state, it delivers non-contact information to the microcomputer 200.

Although not shown, the sensing unit 110 may be connected to the battery 300 to be provided with power therefrom in order to generate the activation signal or deliver the non-contact information to the microcomputer 200.

The latch unit 120 is a device for maintaining the activation signal upon receiving the activation signal from the sensing unit 110. When the activation signal output from the sensing unit 110 is unstable or when a user's contact state is unstable, the latch unit 120 maintains the activation signal so that power from the battery 300 can stably pass through the power saving controlling apparatus 100.

The use of the latch unit 120 eliminates a user's unstable contact behavior or an unstable activation signal generated due to malfunction of the sensing unit 110, thus securing stability of the operation of the microcomputer 200 or the electrical circuit. When power supply and cutoff are frequently repeated, an initial setting operation is frequently performed on the microcomputer 200 or the electrical circuit, which may lead to excessive power consumption and user inconvenience.

Thus, with the power saving controlling apparatus 100 including the sensing unit 110 and the latch unit 120, there is no need to periodically operate a portion or the entirety of the microcomputer 200 and the electrical circuit, which consumes most power, to check whether or not the user comes into contact. Thus, the power saving controlling apparatus 100 can be prevented from consuming power for a periodical operation compared with other power saving controlling apparatuses employing a watch-dog technique.

In addition, the use of the watch-dog technique requires a clock device, or the like, to periodically operate the overall system. In comparison, however, the power saving controlling apparatus 100 according to an exemplary embodiment of the present invention does not need such a clock device, or the like, advantageously simplifying the device configuration.

When the interruption unit 130 receives an interruption signal from an external device, it forcibly releases the maintained state of the activation signal of the latch unit 120. Preferably, the interruption unit 130 may receive the interruption signal from the microcomputer 200 that controls the power saving controlling system and the entire electrical circuit.

When the latch unit 120 receives the activation signal, it maintains the state of the activation signal. Thus, if the signal state is not forcibly released, the signal output from the latch unit 120 is fixed as the activation signal. The method for forcibly releasing the maintained signal state of the latch unit 120 is interrupting the operation of maintaining the signal state to release the maintained signal state or cut off power to stop the operation of maintaining the signal state.

The switch unit 140 is disposed on a power supply path continued from the battery 300 to the microcomputer 200. When the switch unit 140 receives the activation signal from the latch unit 120, it connects the power supply path to supply power to the microcomputer and the circuit. Also, when the switch unit 140 receives a signal other than the activation signal, the switch unit 140 cuts off the power supply path to interrupt power supply.

Figure 2:
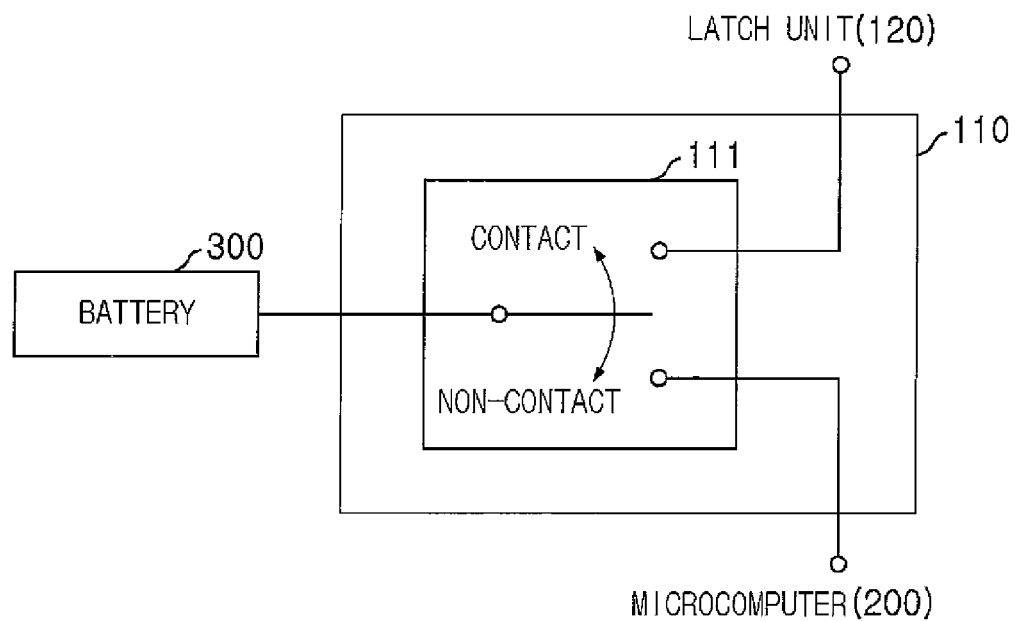
FIG. 2 illustrates an example of a sensing unit according to an exemplary embodiment of the present invention.

FIG. 2 illustrates an example of the sensing unit according to an exemplary embodiment of the present invention.

With reference to FIG. 2, the sensing unit 110 according to an exemplary embodiment of the present invention may include a microswitch 111. The microswitch 111 is a device for connecting a voltage signal generated by the battery 300 to the latch unit 120 or an external device. A signal connection path may be selected by using a contact signal or a non-contact signal. In case of the contact signal, the microswitch connects it to the latch unit 120, and in case of the non-contact signal, the microswitch connects it to the microcomputer 200.

Although not shown, a terminal for transmitting a signal to the microcomputer 200 may be installed at a path connected to the microcomputer 200.

Figure 3:
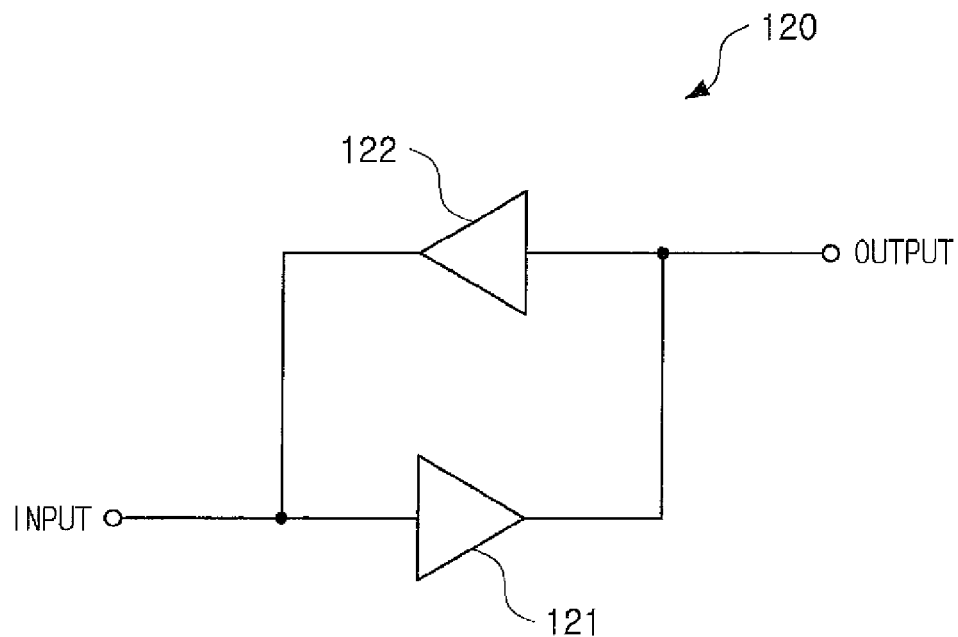
FIG. 3 illustrates an example of function blocks of a latch unit according to an exemplary embodiment of the present invention.

FIG. 3 illustrates an example of function blocks of the latch unit according to an exemplary embodiment of the present invention.

With reference to FIG. 3, the latch unit 120 according to an exemplary embodiment of the present invention may include two amplifiers 121 and 122. In this case, two or more amplifiers may be used as necessary.

The two amplifiers 121 and 122 are inversion amplifiers which are connected in an annular form so as to be negatively fed back to each other. Thus, a state of an input signal is maintained by a positive feedback. When the latch unit 120 is implemented by using the inversion amplifiers, the number of negative feedbacks must be an even number.

In general, an amplifier may be implemented by using an active element.

An output terminal is connected to a point which is not connected to an input terminal, among connection points of the two amplifiers 121 and 122.

Figure 4:
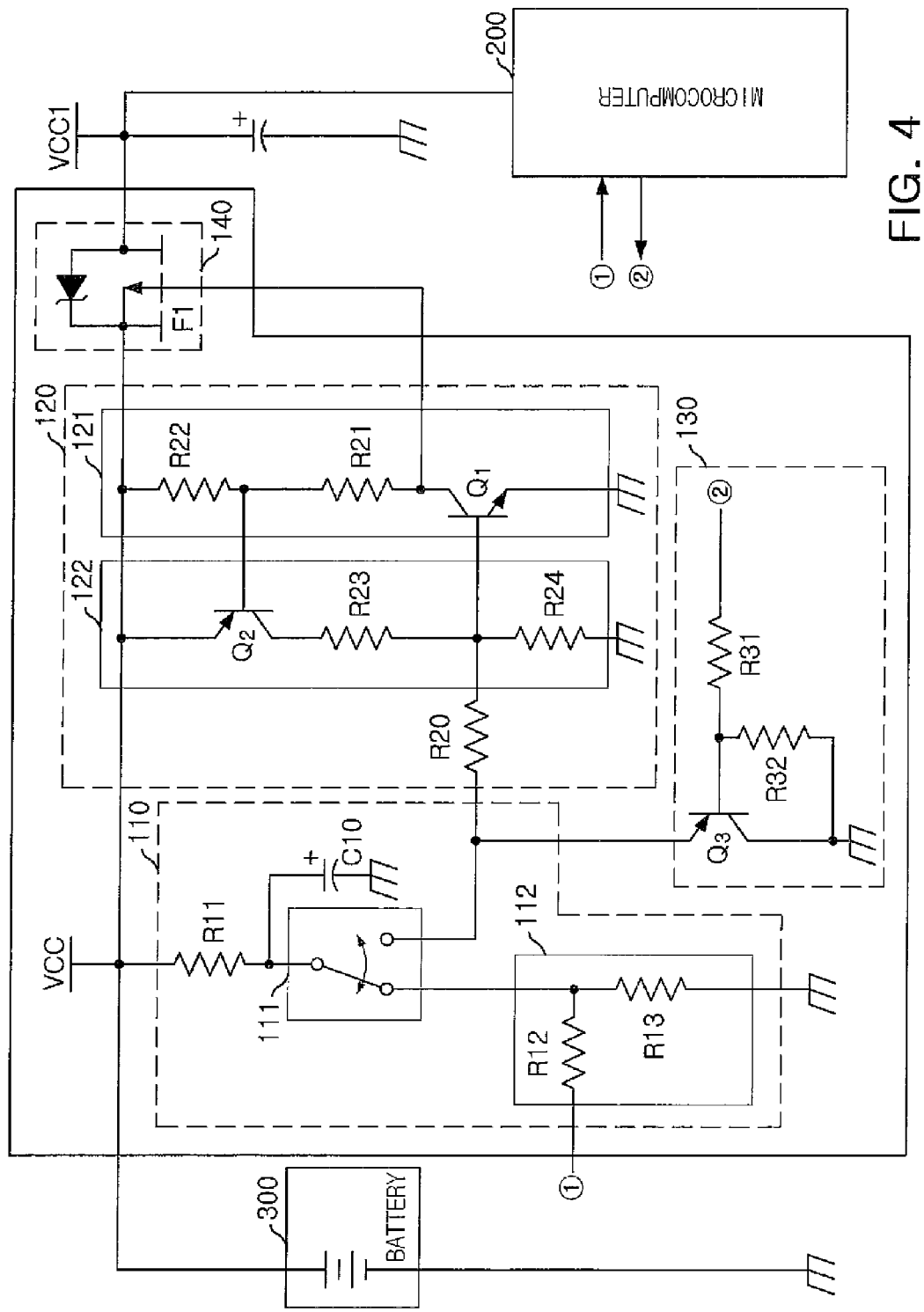
FIG. 4 is a circuit diagram showing an example of the system for controlling power saving according to an exemplary embodiment of the present invention.

FIG. 4 is a circuit diagram showing an example of the system for controlling power saving according to an exemplary embodiment of the present invention.

The battery 300 and the microcomputer 200 have been described in detail above, so a repeated description thereof will be omitted.

With reference to FIG. 4, the sensing unit 110 according to an exemplary embodiment of the present invention may include the microswitch 111 and an output terminal 112.

The activation signal generated by the sensing unit 110 is delivered as a VCC voltage value to the latch unit 120 or the output terminal 112.

The microswitch 111 has been described in detail above, so a repeated description thereof will be omitted.

In order to prevent an excessively large current from flowing to the microcomputer 200 to impact the internal circuit of the microcomputer 200, the output terminal 112 may be implemented by using two resistors R13 and R12. In the output terminal 112, current generated by a voltage signal is allowed to pass toward the resistor R13 and only the voltage signal is output to the R12.

With reference to FIG. 4, the latch unit 120 may be implemented by using two BJT amplifier circuits 121 and 122. The two amplifiers 121 and 122 are inversion amplifiers as common collector amplifiers using a NPN BJT (Q1) and a PNP BJT (Q2), respectively. The amplifiers are connected so as to be negatively fed back to each other, and because an input signal is positively fed back, the signal state can be maintained. An output signal value has a low level which has been inverted from a high value of the activation signal, the input signal.

With reference to FIG. 4, the switch unit 140 according to an exemplary embodiment of the present invention may be implemented as a CMOS (Complementary Metal-Oxide-Semiconductor). When a low value is received by a gate of the switch unit 140, power is connected from the battery 300 to the microcomputer 200.

With reference to FIG. 4, the interruption unit 130 is a switch circuit using a PNP BJT (Q3). When a high interruption signal value is received from the microcomputer 200, a collector and an emitter of the interruption unit 130 are electrically connected. When the interruption unit 130 is operated by an interruption signal, an input terminal of the latch unit 120 is forcibly changed to have a low level and a signal output from the latch unit 120 is changed to have a high level according to the positive feedback. Namely, the maintained state of the activation signal is released.

Figure 5:
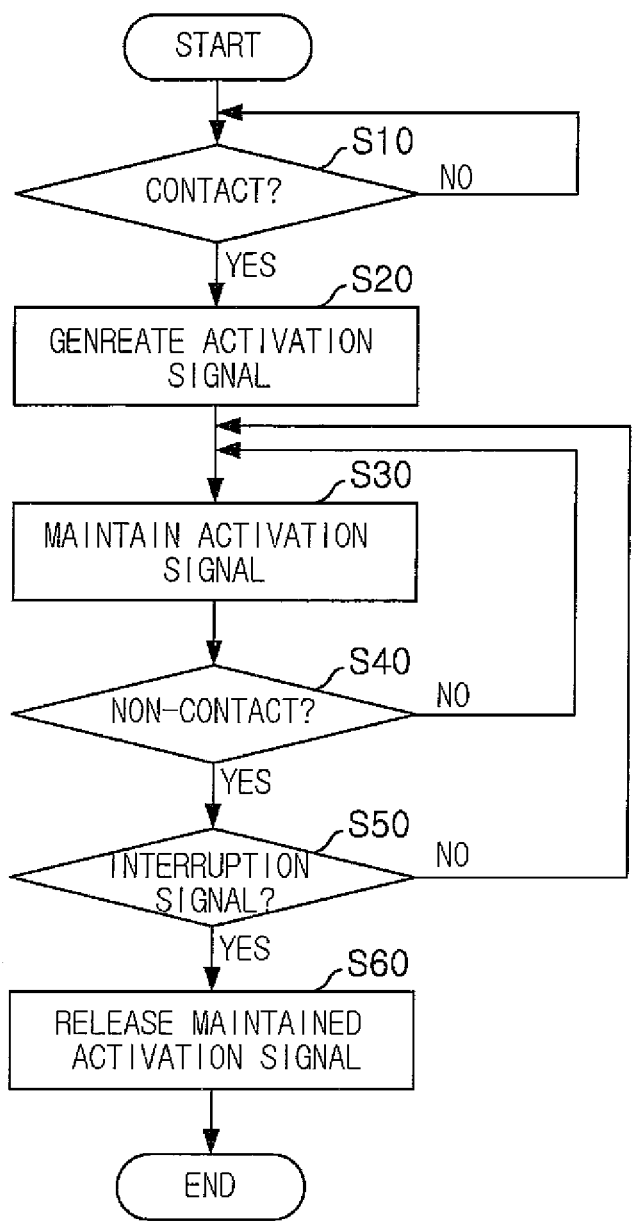
FIG. 5 is a flow chart illustrating the process of a method for controlling power saving by the power saving controlling system according to an exemplary embodiment of the present invention.

FIG. 5 is a flow chart illustrating the process of a method for controlling power saving by the power saving controlling system according to an exemplary embodiment of the present invention.

With reference to FIG. 5, the method for controlling power saving by the power saving controlling system according to an exemplary embodiment of the present invention may include a step S10 of checking a contact, a step S20 of generating an activation signal, a step S30 of maintaining the activation signal, a step S40 of checking a non-contact, a step S50 of determining whether to cut off power, and a step S60 of releasing the maintained activation signal.

In step S10 of checking a contact, it is checked whether or not a power saving controlling system or an electrical circuit employing the system is contacted.

In step S20 of generating an activation signal, when a contact is checked, an activation signal is generated.

In step S30 of maintaining the activation signal, the state of the activation signal is maintained to maintain power supply.

In step S40 of checking a non-contact, it is checked whether or not the external contact has been removed. When the contact continues, the activation signal is maintained.

In step S50 of determining whether to cut off power, when it is checked that the external contact has been removed, it is determined whether to cut off power supply. When it is determined to cut off power supply, an interruption signal is generated.

In step S60 of releasing the maintained activation signal, when the interruption signal is generated, the maintained activation signal is released by using the interruption signal.

In this manner, power saving controlling is performed on the power saving controlling system by using the method as described above.

As set forth above, according to exemplary embodiments of the invention, the power saving controlling apparatus and system operates an electricity system of a bidet or an electronic product only when the bidet or the electronic product is in use, obtaining a high power saving effect.

In addition, the power saving controlling apparatus and system can minimize power consumed by a circuit for power saving, achieving a higher power saving effect.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for controlling power saving, the apparatus comprising:
   a sensing unit detecting a user's contact and generating an activation signal when a user's contact is acknowledged;
   a latch unit maintaining the activation signal which has been received from the sensing unit;
   an interruption unit forcibly interrupting the maintained state of the activation signal of the latch unit when an interruption signal is received from an external device; and
   a switch unit disposed on a current path that delivers power, and connecting the current path according to the activation signal from the latch unit,
   wherein the latch unit comprises,
      a first inversion amplifier inverting the activation signal and transmitting the inverted activation signal to the switch unit; and
      a second inversion amplifier re-inverting the inverted activation signal to generate the activation signal and feeding the activation signal back to the first inversion amplifier,
   wherein the switch unit connects the current path when the inverted activation signal is received from the latch unit.

2. The apparatus of claim 1, wherein the sensing unit comprises a microswitch detecting a change in pressure in the occurrence of a contact or a non-contact.

3. The apparatus of claim 2, wherein the sensing unit further comprises a terminal transferring the change in pressure detected by the microswitch to an external device.

4. The apparatus of claim 1, wherein the switch unit is implemented by using a MOSFET.

5. A system for controlling power saving, the system comprising:
- a battery supplying power;
- a power saving controlling apparatus including a sensing unit detecting a user's contact and generating an activation signal when a user's contact is acknowledged, a latch unit maintaining the activation signal which has been received from the sensing unit, an interruption unit forcibly interrupting the maintained state of the activation signal of the latch unit when an interruption signal is received from an external device, and a switch unit disposed on a current path that delivers power, and connecting the current path according to the activation signal from the latch unit;
- a microcomputer controlling an operation of the system connected upon receiving power from the power saving controlling apparatus; and
- wherein the latch unit comprises,
  - a first inversion amplifier inverting the activation signal and transmitting the inverted activation signal to the switch unit; and
  - a second inversion amplifier re-inverting the inverted activation signal to generate the activation signal and feeding the activation signal back to the first inversion amplifier,
- wherein the switch unit connects the current path when the inverted activation signal is received from the latch unit.

6. The system of claim 5, wherein the sensing unit comprises a microswitch detecting a change in pressure in the occurrence of a contact or non-contact.

7. The system of claim 6, wherein the sensing unit further comprises a terminal transferring information regarding the change in pressure to the microcomputer, and the microcomputer determines whether or not a contact has been made based on the change in pressure which has been detected by the microswitch and generates an interruption signal when it determines that the contact has been removed.

8. The system of claim 7, wherein when power interruption is required, the microcomputer controls the interruption unit to generate an interruption signal regardless of a signal received from the sensing unit.

9. The system of claim 5, wherein the switch unit is implemented by using a MOSFET.

* * * * *